(12) United States Patent
Konaté et al.

(10) Patent No.: US 11,002,392 B2
(45) Date of Patent: May 11, 2021

(54) PIPELINE SYSTEM WITH AUTOMATICALLY CLOSING PORT

(71) Applicant: SOCLA SAS, Virey le Grand (FR)

(72) Inventors: Ousmane Konaté, Hautvillers Ouville (FR); Christophe Foldyna, Virey le Grand (FR)

(73) Assignee: SOCLA SAS, Virey le Grand (FR)

( * ) Notice: Subject to any disclaimer, the term of this patent is extended or adjusted under 35 U.S.C. 154(b) by 0 days.

(21) Appl. No.: 16/805,074

(22) Filed: Feb. 28, 2020

(65) Prior Publication Data

US 2021/0041047 A1   Feb. 11, 2021

(30) Foreign Application Priority Data

Aug. 9, 2019  (EP) ..................................... 19191034

(51) Int. Cl.
  *F16L 29/00*   (2006.01)
  *F16K 5/06*   (2006.01)
  *F16K 15/02*   (2006.01)

(52) U.S. Cl.
  CPC ............. *F16L 29/007* (2013.01); *F16K 5/06* (2013.01); *F16L 29/002* (2013.01); *F16K 15/025* (2013.01); *Y10T 137/87917* (2015.04)

(58) Field of Classification Search
  CPC ......... F16L 29/007; F16L 29/002; F16K 5/06; Y10T 137/87917
  USPC ........................................ 137/613; 251/149.4
  See application file for complete search history.

(56) References Cited

U.S. PATENT DOCUMENTS

| | | | | |
|---|---|---|---|---|
| 808,910 | A | * | 1/1906 | Dunham ............... B01D 35/043 137/613 |
| 932,153 | A | * | 8/1909 | Martin ................. B67D 1/1247 137/613 |
| 1,212,104 | A | * | 1/1917 | Procker ................... C02F 1/003 210/432 |
| 7,174,915 | B2 | * | 2/2007 | Fazekas .................... F16K 5/06 137/613 |

FOREIGN PATENT DOCUMENTS

| | | |
|---|---|---|
| DE | 1797197 | 10/1959 |
| EP | 0261326 | 3/1988 |
| EP | 1640513 | 3/2006 |
| WO | 2012/063223 | 5/2012 |

OTHER PUBLICATIONS

Extended European Search Report for European Patent Application No. 19191034.8, dated Feb. 6, 2020, 8 pages.

* cited by examiner

*Primary Examiner* — Kevin L Lee
(74) *Attorney, Agent, or Firm* — Burns & Levinson, LLP; George N. Chaclas

(57) ABSTRACT

A pipeline assembly includes a hollow body having a first opening and a second opening. A valve port fluidly coupled to the first opening is provided on the body and a valve port seat is disposed in the valve port. A shutter is urged against the valve port seat by a spring fluidly de-coupling the second opening from the first opening and the valve port. A valve plug includes a check valve. When the valve plug is disposed in the valve port, the valve plug decouples the shutter from the valve port seat to fluidly couple the first opening and the second opening with a fluid flow in only a first direction when the check valve is in an open condition.

23 Claims, 4 Drawing Sheets

PIPELINE SYSTEM WITH AUTOMATICALLY CLOSING PORT

CROSS-REFERENCE TO RELATED APPLICATION

This application claims priority to European Patent Application No. 19191034.8, entitled "Pipeline System With Automatically Closing Port," filed on Aug. 9, 2019 which is hereby incorporated by reference in its entirety for all purposes.

FIELD OF THE DISCLOSURE

The subject disclosure relates to a pipeline assembly and, more particularly, to a system for automatically closing a downstream valve to facilitate maintenance operations.

BACKGROUND

In many water, or fluid, supply systems, a pipeline system will include a backflow prevention valve and assembly, sometimes referred to as a backflow preventer (BFP) unit. The BFP unit assures that a fluid, and any solids therein, flows in only a desired direction, i.e., a forward direction, as a backflow may cause contamination and health problems. Often, a BFP unit is required per local ordinances and regulations. Backflow prevention valves and assemblies are installed in buildings, such as residential homes, and commercial buildings and factories, to protect public water supplies by preventing the reverse flow of contaminated water back into the public water supply.

A typical BFP unit includes an inlet shutoff valve and an outlet shutoff valve with a backflow prevention valve, sometime referred to as a "check valve," positioned between the inlet and outlet shutoff valves. Many different configurations of backflow prevention assemblies are commercially available, each being different in configuration.

Owing to the fact that BFP units are important for water safety, they are manually tested on an annual basis, often per government regulations, to assure proper operating condition. Specifically, fluid pressure measurements are taken at specified locations in the BFP unit. If it is determined that a check valve needs to be replaced, the inlet and outlet shutoff valves have to be closed, the check valve replaced and tested, the shutoff valves opened and the apparatus confirmed to be operating per any local ordinances and/or standards. The process is time-consuming and the steps have to be performed in the correct sequence in order to not contaminate the public water supply or inadvertently flood an area.

What is needed is a better system for maintaining a pipeline system that includes a backflow prevention system.

SUMMARY

In one aspect of the present disclosure there is a pipeline assembly, comprising: a body having an interior space defined therein; an outlet opening, provided on the hollow body, fluidly coupled to the body interior space; a valve port opening, provided on the body, fluidly coupled to the body interior space; a valve port seat disposed in the valve port; a shutter; and a spring, coupled to the shutter, configured to urge the shutter against the valve port seat to fluidly decouple the outlet opening from the valve port opening.

In one aspect of the present disclosure there is a pipeline assembly comprising: a hollow body having a first opening and a second opening; a valve port provided on the hollow body, wherein the valve port is fluidly coupled to the first opening; a valve port seat disposed in the valve port; a shutter; and a spring, coupled to the shutter, configured to urge the shutter against the valve port seat to fluidly decouple the second opening from the first opening.

In one aspect the pipeline assembly comprises a valve plug disposed in the valve port, wherein the valve plug decouples the shutter from the valve port seat to fluidly couple the first opening and the second opening to one another.

In another aspect, the valve plug further comprises: a valve plug body; a check valve disposed in the valve plug body between a first space and a second space defined in the valve plug body, wherein the check valve is configured to prevent a fluid flow between the second space and the first space when the check valve is in a closed configuration, and wherein, when the check valve is in the closed configuration, the first space is fluidly coupled to the first opening and not fluidly coupled to the second opening.

In another aspect of the present disclosure, a valve plug comprises: a valve plug body; and at least one of: a check valve disposed in the valve plug body between a first space and a second space defined in the valve plug body, wherein the check valve is configured to prevent a fluid flow between the second space and the first space when the check valve is in a closed configuration; or a filter disposed in the valve plug body between the first space and the second space, wherein the filter is configured to filter out unwanted particles in a fluid flow between the first and second spaces.

In another aspect of the present disclosure there is a pipeline assembly, comprising: a hollow body having an interior space; an inlet opening and an outlet opening, each provided on the hollow body and each fluidly coupled to the body interior space; a valve port provided on the hollow body and fluidly coupled to the inlet opening; a valve port seat disposed in the valve port; a shutter; a spring, coupled to the shutter, configured to urge the shutter against the valve port seat; and a valve plug body disposed in the valve port, wherein the valve plug decouples the shutter from the valve port seat.

BRIEF DESCRIPTION OF THE DRAWINGS

Various aspects of the disclosure are discussed herein with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The Figures are provided for the purposes of illustration and explanation and are not intended as a definition of the limits of the disclosure. In the Figures.

DETAILED DESCRIPTION

Figure 1:
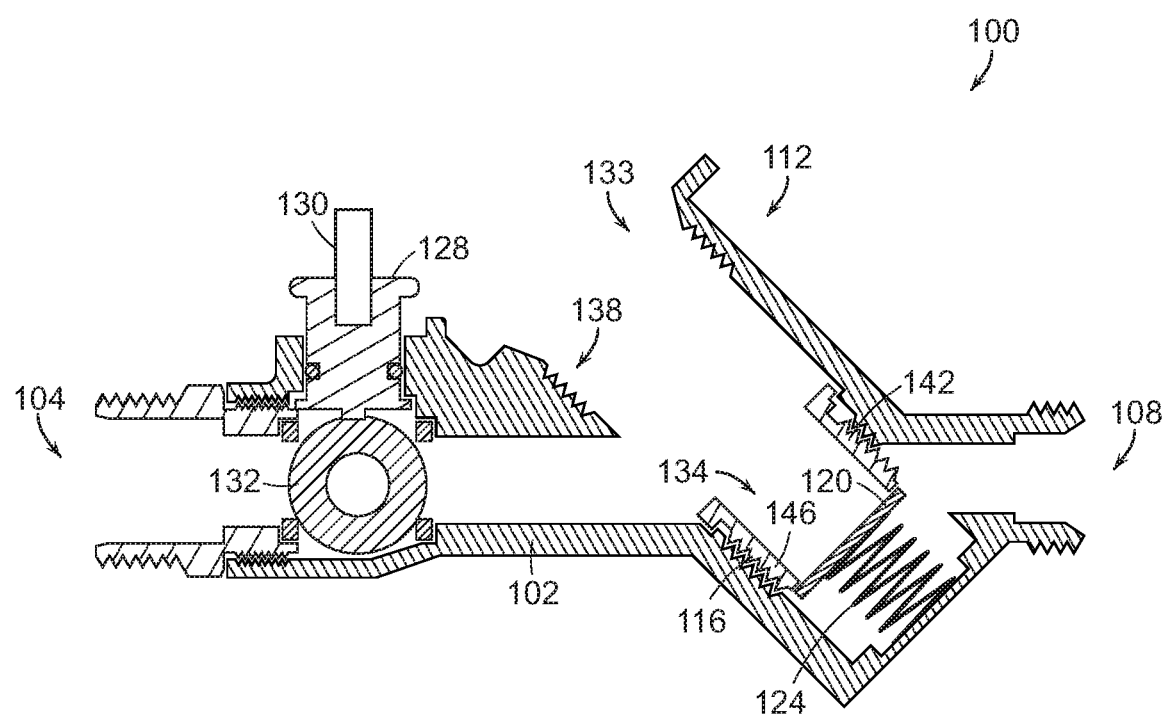
FIG. 1 is a pipeline assembly in accordance with an aspect of the present disclosure.

This application claims priority to European Patent Application No. 19191034.8, entitled "Pipeline System With Automatically Closing Port," filed on Aug. 9, 2019 which is hereby incorporated by reference in its entirety for all purposes.

Aspects of the present disclosure are applicable to many different pipeline systems and not just those that incorporate a backflow prevention system. Accordingly, a pipeline system with a backflow prevention system is merely referenced herein as an aid to explaining the various embodiments of the present disclosure.

The subject technology overcomes many of the known problems associated with pipeline assemblies that incorporate backflow prevention assemblies. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

A pipeline assembly 100, for example, a backflow prevention system, as shown in FIG. 1, and in accordance with an aspect of the present disclosure, includes a hollow body 102 having a first opening 104, i.e., an inlet, and a second opening 108, i.e., an outlet. A valve port 112 is provided in the body 102 and is fluidly coupled to the first opening 104. A valve port seat 116 is disposed in the valve port 112. A shutter 120 is urged by a spring 124 against the valve port seat 116 to fluidly de-couple the second opening 108 from the first opening 104 and the valve port 112. A ball valve assembly 128 including a handle 130 and a ball 132 is configured to fluidly de-couple or couple the inlet 104 from an interior of the body 102 as shown in FIG. 1.

The valve port 112 includes a proximal portion 133 and a distal portion 134. An interior proximal threaded portion 138 is provided adjacent the proximal portion 133. An interior distal threaded portion 142 is provided adjacent the distal portion 134. The valve port seat 116 includes an exterior threaded portion 146 such that the valve port seat 116 can be threadably coupled to the distal portion 134 of the valve port 112.

As the spring 124 is configured to urge the shutter 120 against the valve seat port 116, the outlet port 108 is fluidly de-coupled, i.e., isolated from the interior of the body 102. Advantageously, a second ball valve is not needed to isolate the "downstream" fluid from source. This simplifies the backflow prevention assembly as one less valve is needed. Accordingly, the assembly is less expensive and any method of repairing or replacing components is simplified.

Figure 2:
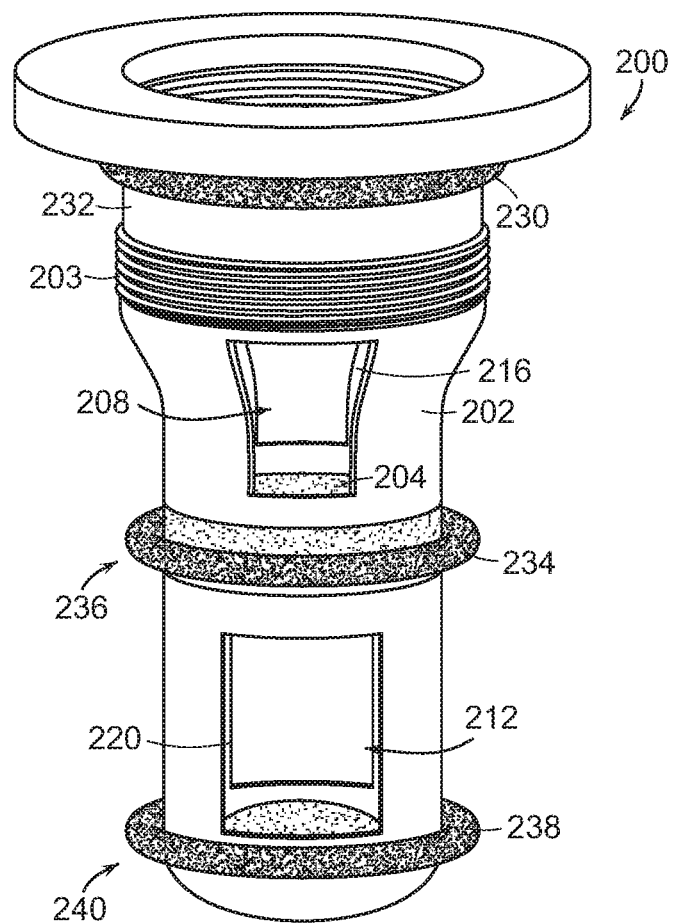
FIG. 2 is a valve plug in accordance with an aspect of the present disclosure.

Referring now to FIG. 2, a backflow prevention valve plug 200, in accordance with an aspect of the present disclosure, includes a valve plug body 202. The valve plug body 202 is provided with a threaded exterior portion 203 the purpose of which will be described below. A check valve 204 is disposed in the valve plug body 202 between a first space 208 and a second space 212 defined in the valve plug body 202. The check valve 204 is configured to prevent a fluid flow between the second space 212 and the first space 208 when the check valve 204 is in a closed configuration. The construction of a check valve is well known to those of ordinary skill in the art and need not be described in detail here. The valve plug 200 also includes at least one first space vent 216 defined in the valve plug body 202 in fluid connection with the first space 208 and at least one second space vent 220 defined in the valve plug body 202 in fluid connection with the second space 212. The valve plug 200 also includes a proximal O-ring 230 located about a proximal portion 232 of the valve plug 200, a mid O-ring 234 located about a mid portion 236 of the valve plug 200 and a distal O-ring 238 located about a distal portion 240 of the valve plug 200. As will be described below, each of the O-rings 234, 238 provides a fluid-tight seal between the valve plug 200 and the valve port seat 116.

Figure 3:
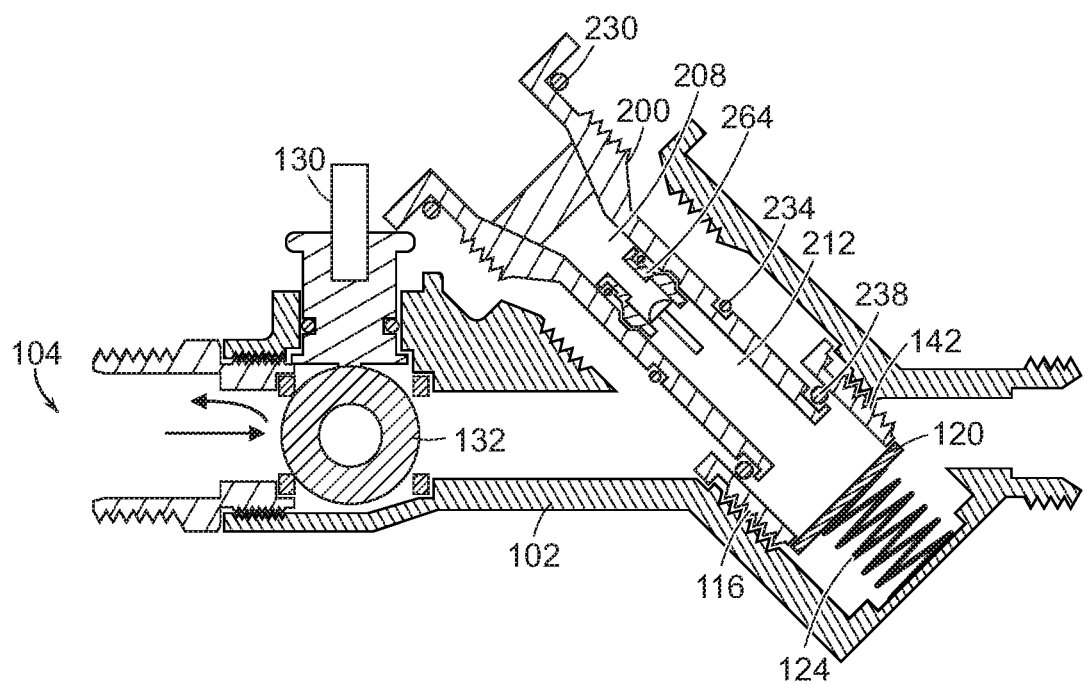
FIG. 3 represents the valve plug of FIG. 2 with respect to the assembly of FIG. 1 in accordance with an aspect of the present disclosure.
Figure 4:
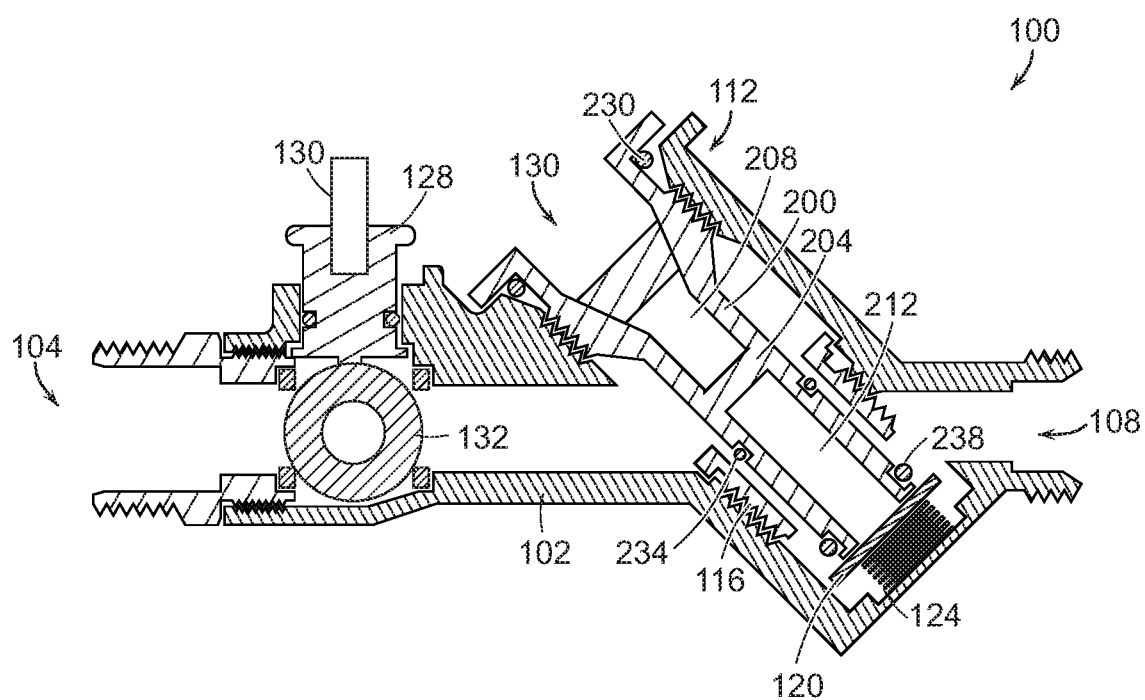
FIG. 4 represents the valve plug inserted in the assembly of FIG. 1.

Referring now to FIGS. 3 and 4, when the valve plug 200 is fully disposed in the valve port 112, the valve plug 200 decouples the shutter 120 from the valve port seat 116 to fluidly couple the opening 104 and the second opening 108 with the second space 212 of the valve plug 200. As the check valve 204 remains closed, any downstream fluid remains isolated from the source. As one of ordinary skill in the art will understand, when the ball valve 128 is closed, as shown in FIG. 3, the valve plug 200 can be removed and replaced or otherwise serviced.

The O-rings 234, 238 are positioned on the valve plug 200 such that, in the case when the plug 200 is being removed, at least the distal O-ring 238 is still in contact with the valve port seat 116 after the shutter 120 has closed. Further, when the plug 200 is being inserted, at least the mid O-ring 234 is in contact with the valve port seat 116 before the shutter 120 has opened. Advantageously, the potential leakage of fluid is minimized in either situation of placement or removal.

The valve plug 200, in one aspect of the present disclosure, can be threadably screwed into the check valve port 112 through the interaction of the interior threaded portion 138 and the threaded exterior portion 203.

Figure 5:
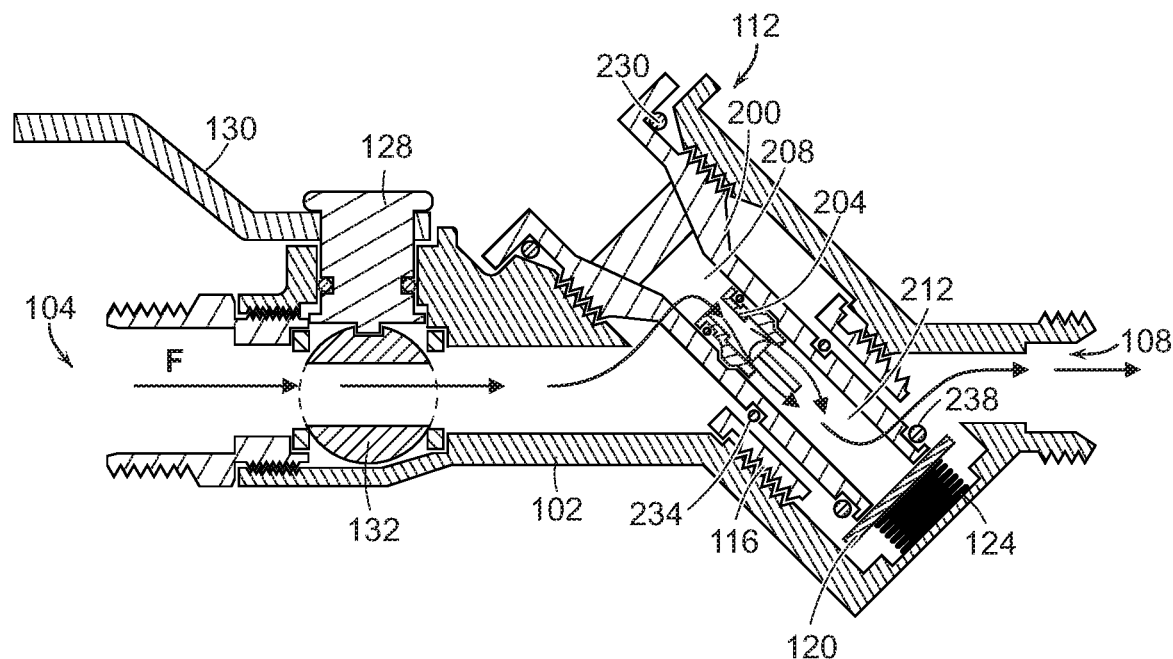
FIG. 5 represents operation of the assembly of FIG. 4.

When the ball valve 128 is opened, as shown in FIG. 5, fluid will flow in a direction F from the inlet 104 to the outlet 108 without backward contamination or flow. It should be noted, however, that when the valve plug 200 is fully inserted in the check valve port 112, and the check valve 204 is in the closed configuration, the first space 208 is fluidly coupled to the first opening 104 and not fluidly coupled to the second opening 108. Further, when the check valve 204 is in the closed configuration, the second space 212 is fluidly coupled to the second opening 108 and not fluidly coupled to the first opening 104.

Figure 6:
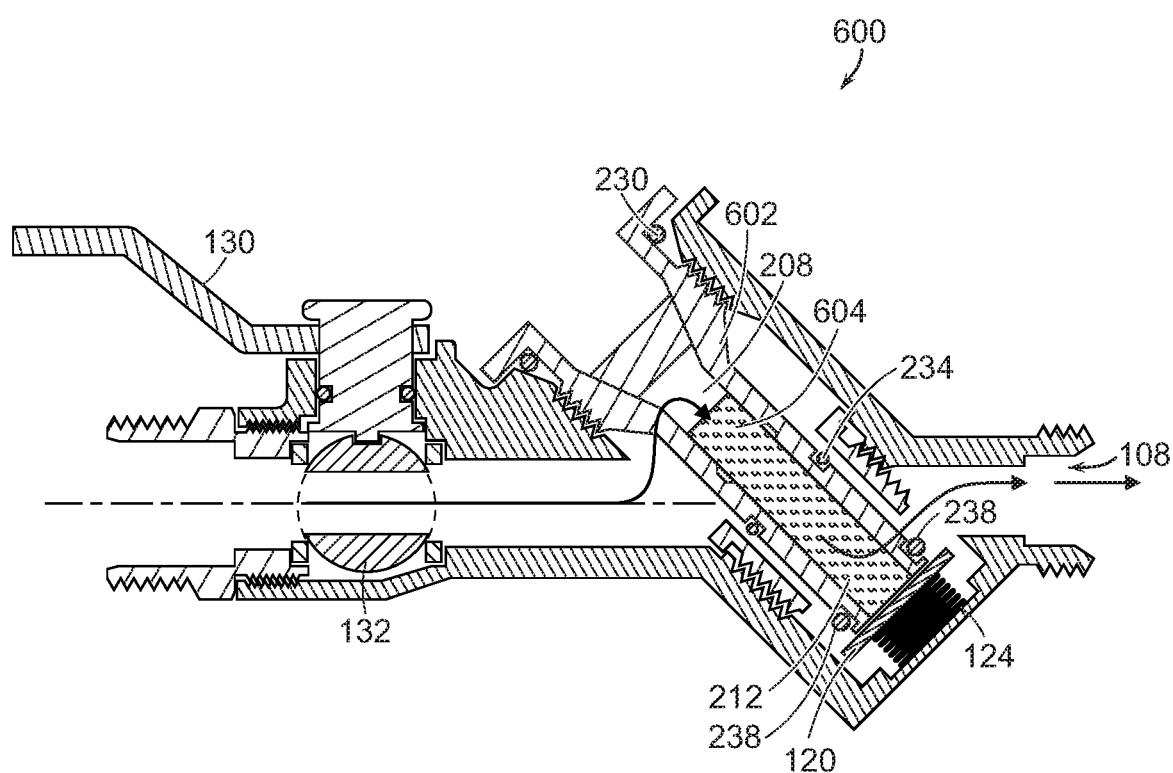
FIG. 6 represents a pipeline assembly incorporating a filter plug.

In another aspect of the present disclosure, a pipeline system 600 includes a filter plug 602 as shown in FIG. 6. The filter plug 602 includes a filtering component 604, for example, a screen or sieve, disposed in the valve plug body 602 to filter out unwanted particles in a fluid flow from the first space 208 to the second space 212. The insertion/removal of the filter plug 602 is performed in the same manner as described above with respect to the operation of the shutter 120.

Advantageously, as understood by one of ordinary skill in the art, in another embodiment, an outlet ball valve need not be provided as the outlet 108 is automatically closed off when the valve plug 200 is removed.

In addition, a filtration function can be incorporated into the valve plug 200 by providing a sieve or filtering screen around the at least one first space vent 216 in fluid connection with the first space 208. Accordingly, unwanted particles can be removed from the downstream flow.

Further, to avoid, or lower, the risk of backflow into the public network, the assembly 100 can be mounted such that the proximal end 130 of the valve port 112 is oriented downward. In this orientation, any residual fluid is drained to the outside, due to gravity, during the servicing of the assembly 100 as set forth above.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., check valves, shut-off valves, and the like) shown as distinct for purposes of illustration may be incorporated within other functional elements in a particular implementation.

While the subject technology has been described with respect to various embodiments, those skilled in the art will readily appreciate that various changes and/or modifications can be made to the subject technology without departing from the scope of the present disclosure.

What is claimed is:

1. A pipeline assembly, comprising:
a body having an interior space defined therein;
an outlet opening, provided on the body, fluidly coupled to the body interior space;
a valve port opening, provided on the body, fluidly coupled to the body interior space;
a valve port seat disposed in the valve port opening;
a shutter;
a spring, coupled to the shutter, configured to urge the shutter against the valve port seat to fluidly de-couple the outlet opening from the valve port opening;
a valve plug positioned in the valve port opening to decouple the shutter from the valve port seat; and
a filter disposed in the valve plug.

2. The pipeline assembly of claim 1, wherein the valve port seat is threadably coupled to the body.

3. The pipeline assembly of claim 1, wherein the valve plug is threadably coupled to the valve port opening.

4. The pipeline assembly of claim 1, wherein the valve plug further comprises:
a check valve configured to prevent a fluid flow in a direction from the outlet opening.

5. The pipeline assembly of claim 1, wherein:
the valve plug is configured to fluidly isolate the valve port opening from the body interior space.

6. The pipeline assembly of claim 5, wherein the valve plug further comprises:
a valve plug body; and
a check valve defining a first interior valve space and a second interior valve space in an interior of the valve plug body, the first interior valve space fluidly coupled to the body interior space,
wherein the check valve, when in a closed configuration, prevents a fluid flow between the first and second interior valve spaces.

7. A pipeline assembly, comprising:
a hollow body having a first opening and a second opening;
a valve port provided on the hollow body, wherein the valve port is fluidly coupled to the first opening;
a valve port seat disposed in the valve port;
a shutter;
a spring, coupled to the shutter, configured to urge the shutter against the valve port seat to fluidly de-couple the second opening from the first opening;
a valve plug disposed in the valve port, wherein the valve plug decouples the shutter from the valve port seat to fluidly couple the first opening and the second opening to one another; and
a check valve disposed in the valve plug, wherein the check valve is configured to prevent a fluid flow in a direction from the second opening to the first opening.

8. The pipeline assembly of claim 7, further comprising:
a filter disposed in the valve plug.

9. The pipeline assembly of claim 7, wherein the valve plug further comprises:
a valve plug body;
a check valve disposed in the valve plug body between a first space and a second space defined in the valve plug body,
wherein the check valve is configured to prevent a fluid flow between the second space and the first space when the check valve is in a closed configuration, and
wherein, when the check valve is in the closed configuration, the first space is fluidly coupled to the first opening and not fluidly coupled to the second opening.

10. The pipeline assembly of claim 9, wherein the valve plug further comprises:
at least one first space vent defined in the valve plug body in fluid connection with the first space; and
at least one second space vent defined in the valve plug body in fluid connection with the second space.

11. The pipeline assembly of claim 7, wherein the valve port seat is disposed within the hollow body.

12. The pipeline assembly of claim 7, wherein the valve plug is threadably coupled to the valve port.

13. The pipeline assembly of claim 7, wherein the valve port seat is threadably coupled to the body.

14. A pipeline assembly, comprising:
a hollow body having an interior space;
an inlet opening and an outlet opening, each provided on the hollow body and each fluidly coupled to the body interior space;
a valve port provided on the hollow body and fluidly coupled to the inlet opening;
a valve port seat disposed in the valve port;
a shutter;
a spring, coupled to the shutter, configured to urge the shutter against the valve port seat; and
a valve plug body disposed in the valve port,
wherein the valve plug decouples the shutter from the valve port seat; and
further comprising at least one of: a check valve disposed in the valve plug body between a first space and a second space defined in the valve plug body, wherein the check valve is configured to prevent a fluid flow between the second space and the first space when the check valve is in a closed configuration; or a filter disposed in the valve plug body between the first space and the second space, wherein the filter is configured to filter out unwanted particles in a fluid flow between the first and second spaces.

15. The pipeline assembly of claim 14, wherein the valve plug body is threadably coupled to the valve port.

16. The pipeline assembly of claim 14, wherein the valve port seat is threadably coupled to the hollow body.

17. A pipeline assembly, comprising:
   a body having an interior space defined therein;
   an outlet opening, provided on the body, fluidly coupled to the body interior space;
   a valve port opening, provided on the body, fluidly coupled to the body interior space;
   a valve port seat disposed in the valve port opening;
   a shutter;
   a spring, coupled to the shutter, configured to urge the shutter against the valve port seat to fluidly de-couple the outlet opening from the valve port opening; and
   a valve plug positioned in the valve port opening to decouple the shutter from the valve port seat, wherein the valve plug further comprises a check valve configured to prevent a fluid flow in a direction from the outlet opening.

18. The pipeline assembly of claim 17, wherein the valve plug is configured to fluidly isolate the valve port opening from the body interior space.

19. The pipeline assembly of claim 18, wherein the valve plug further comprises:
   a valve plug body;
   a check valve defining a first interior valve space and a second interior valve space in an interior of the valve plug body, the first interior valve space fluidly coupled to the body interior space, wherein the check valve, when in a closed configuration, prevents a fluid flow between the first and second interior valve spaces;
   at least one first space vent defined in the valve plug body in fluid connection with the first interior valve space; and
   at least one second space vent defined in the valve plug body in fluid connection with the second interior valve space.

20. The pipeline assembly of claim 18, wherein the valve plug further comprises:
   at least one first space vent defined in the valve plug body in fluid connection with the first interior valve space; and
   at least one second space vent defined in the valve plug body in fluid connection with the second interior valve space.

21. A pipeline assembly, comprising:
   a body having an interior space defined therein;
   an outlet opening, provided on the body, fluidly coupled to the body interior space;
   a valve port opening, provided on the body, fluidly coupled to the body interior space;
   a valve port seat disposed in the valve port opening;
   a shutter;
   a spring, coupled to the shutter, configured to urge the shutter against the valve port seat to fluidly de-couple the outlet opening from the valve port opening;
   a valve plug positioned in the valve port opening to decouple the shutter from the valve port seat,
   wherein the valve plug is configured to fluidly isolate the valve port opening from the body interior space, and
   wherein the valve plug further comprises: a valve plug body; and a check valve defining a first interior valve space and a second interior valve space in an interior of the valve plug body, the first interior valve space fluidly coupled to the body interior space, wherein the check valve, when in a closed configuration, prevents a fluid flow between the first and second interior valve spaces.

22. The pipeline assembly of claim 21, wherein the valve plug is configured to fluidly isolate the valve port opening from the body interior space.

23. The pipeline assembly of claim 22, wherein the valve plug further comprises:
   a valve plug body;
   a check valve defining a first interior valve space and a second interior valve space in an interior of the valve plug body, the first interior valve space fluidly coupled to the body interior space, wherein the check valve, when in a closed configuration, prevents a fluid flow between the first and second interior valve spaces;
   at least one first space vent defined in the valve plug body in fluid connection with the first interior valve space; and
   at least one second space vent defined in the valve plug body in fluid connection with the second interior valve space.

\* \* \* \* \*